J. DERR.
Meat Cutter.
No. 55,251. Patented June 5, 1866.
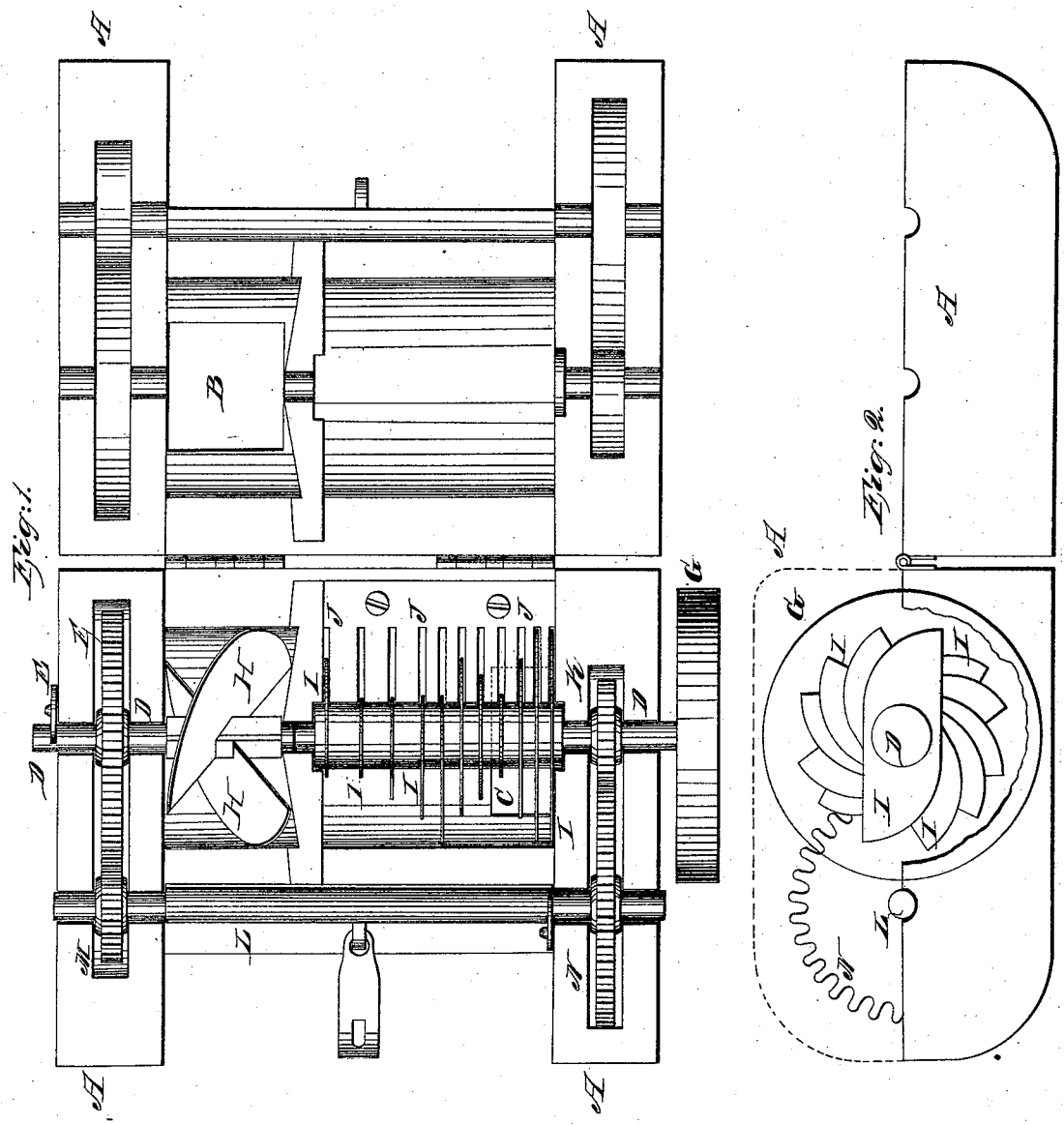

UNITED STATES PATENT OFFICE.

JOSHUA DERR, OF OLEY, PENNSYLVANIA.

IMPROVED MEAT-CUTTER.

Specification forming part of Letters Patent No. 55,251, dated June 5, 1866.

*To all whom it may concern:*

Be it known that I, JOSHUA DERR, of Oley, Berks county, State of Pennsylvania, have invented a new and useful Improved Meat-Cutter; and I do hereby declare the following to be an exact description of the same, reference being had to the accompanying drawings, and to the letters of reference marked thereon, making a part of this specification.

The nature of my invention consists in the arrangement and combination of two spirally-set cutters in a close box, the cutters passing between a comb-shaped series of horizontal teeth or cleaners, and the operation of the machine being such that it has nine rapid revolutions to one motion of the crank.

Figure 1 represents a top view with the lid open; Fig. 2, a side or end view with the top closed and open.

A represents the box containing the devices, having a square aperture, B, at top, through which the meat in square pieces is dropped, and an oblong aperture, C, beneath, through which the finely-cut meat is discharged. D is a shaft extending through the center of the box, with a crank, E, and cog-wheel F at one end and a fly-wheel, G, and pinion K at the other end. This shaft is the axis of the cutters H and I. The cutters H, upon which the meat is dropped, are formed of two semicircular knives set obliquely across the axis. These knives cut the meat and force it along under the cutters I, with its cutters I set spirally on the axle D, that cut and chop the meat finely and carry it along to the discharge-aperture C. These cutters I pass between horizontal cleaners J, that are attached to the side of the box, that keep the knives from choking and the sinews of the meat from lapping around the knives.

Another shaft, L, extends along the front of the box parallel with D, upon which is a pinion, M, at one end, that gears into cog-wheel F, and a cog-wheel, N, at the other end of shaft, that gears into pinion K, the gearing so arranged as to give the cylinders or cutters nine revolutions to one of the crank, while the meat is being dropped into the machine without pressure, and cut finely and discharged without being mashed or squeezed, as is usually the case with other machines.

What I claim as my invention, and desire to secure by Letters Patent, is—

The construction, arrangement, and combination of the cutters H and I and cleaners J, when operated as herein described, and for the purposes set forth.

JOSHUA DERR.

Witnesses:
    P. P. O. HOFFMAN,
    B. A. GLASE.